United States Patent [19]

Fogg et al.

[11] Patent Number: 4,522,276
[45] Date of Patent: Jun. 11, 1985

[54] INDIVIDUAL NUCLEAR FUEL ROD WEIGHING SYSTEM

[75] Inventors: James L. Fogg, Columbia; George E. Vining, West Columbia; John H. Smith; Cecil A. Howell, both of Columbia, all of S.C.

[73] Assignee: Westinghouse Electric Corp., Pittsburgh, Pa.

[21] Appl. No.: 505,669

[22] Filed: Jun. 20, 1983

[51] Int. Cl.³ .................. G01G 19/00; G01G 23/02; B65G 11/33
[52] U.S. Cl. .................................. 177/145; 177/151; 414/403
[58] Field of Search ............... 177/145, 151; 414/146, 414/403, 404, 748

[56] References Cited

U.S. PATENT DOCUMENTS

| | | | |
|---|---|---|---|
| 2,923,952 | 2/1960 | Sawdey | 414/748 X |
| 2,925,166 | 2/1960 | Sawdey | 414/748 X |
| 3,299,609 | 1/1967 | Hill | 177/145 X |
| 3,997,933 | 12/1976 | Garnier | 414/404 X |
| 4,174,662 | 11/1979 | Klusmier | 414/748 X |
| 4,292,788 | 10/1981 | King | 414/748 X |
| 4,338,057 | 7/1982 | Molins | 414/403 X |
| 4,462,749 | 7/1984 | Crocker et al. | 414/748 |

Primary Examiner—George H. Miller, Jr.
Attorney, Agent, or Firm—D. E. Erickson

[57] ABSTRACT

An individual nuclear fuel rod weighing system for rods carried on a tray which moves along a materials handling conveyor. At a first tray position on the conveyor, a lifting device raises the rods off the tray and places them on an overhead ramp. A loading mechanism conveys the rods singly from the overhead ramp onto an overhead scale for individual weighing. When the tray is at a second position on the conveyor, a transfer apparatus transports each weighed rod from the scale back onto the tray.

10 Claims, 7 Drawing Figures

4,522,276

INDIVIDUAL NUCLEAR FUEL ROD WEIGHING SYSTEM

BACKGROUND OF THE INVENTION

The present invention relates generally to weighing nuclear reactor fuel rods and more particularly to a system for individually weighing newly manufactured nuclear fuel rods carried on a tray moving along a materials handling conveyor towards eventual assemblage into a nuclear reactor fuel assembly.

Individual nuclear fuel rods have been manually weighed in the past as part of a procedure to calculate the amount of nuclear fuel placed inside the rod. What is needed is an automatic rod weighing system for incorporation into an automated nuclear fuel rod quality control inspection line.

SUMMARY OF THE INVENTION

Briefly stated, the invention is directed towards an individual nuclear fuel rod weighing system for rods carried on a tray which moves along a materials handling conveyor. When the tray is at a first position along the conveyor, a lifting device raises the rods off the tray and sets them on an overhead ramp. A loading mechanism conveys the rods singly from the overhead ramp onto an overhead scale for individual weighing. When the tray is at a second position along the conveyor, a transfer apparatus transports each weighed rod from the scale back onto the tray.

BRIEF DESCRIPTION OF THE DRAWINGS

The subject matter of the invention is particularly pointed out and distinctly claimed in the concluding portion of this specification. The invention, however, both as to organization and method of operation, together with further advantages thereof, may best be understood by reference to the following description taken in connection with the accompanying drawings in which:

DETAILED DESCRIPTION OF THE INVENTION

Figure 1:
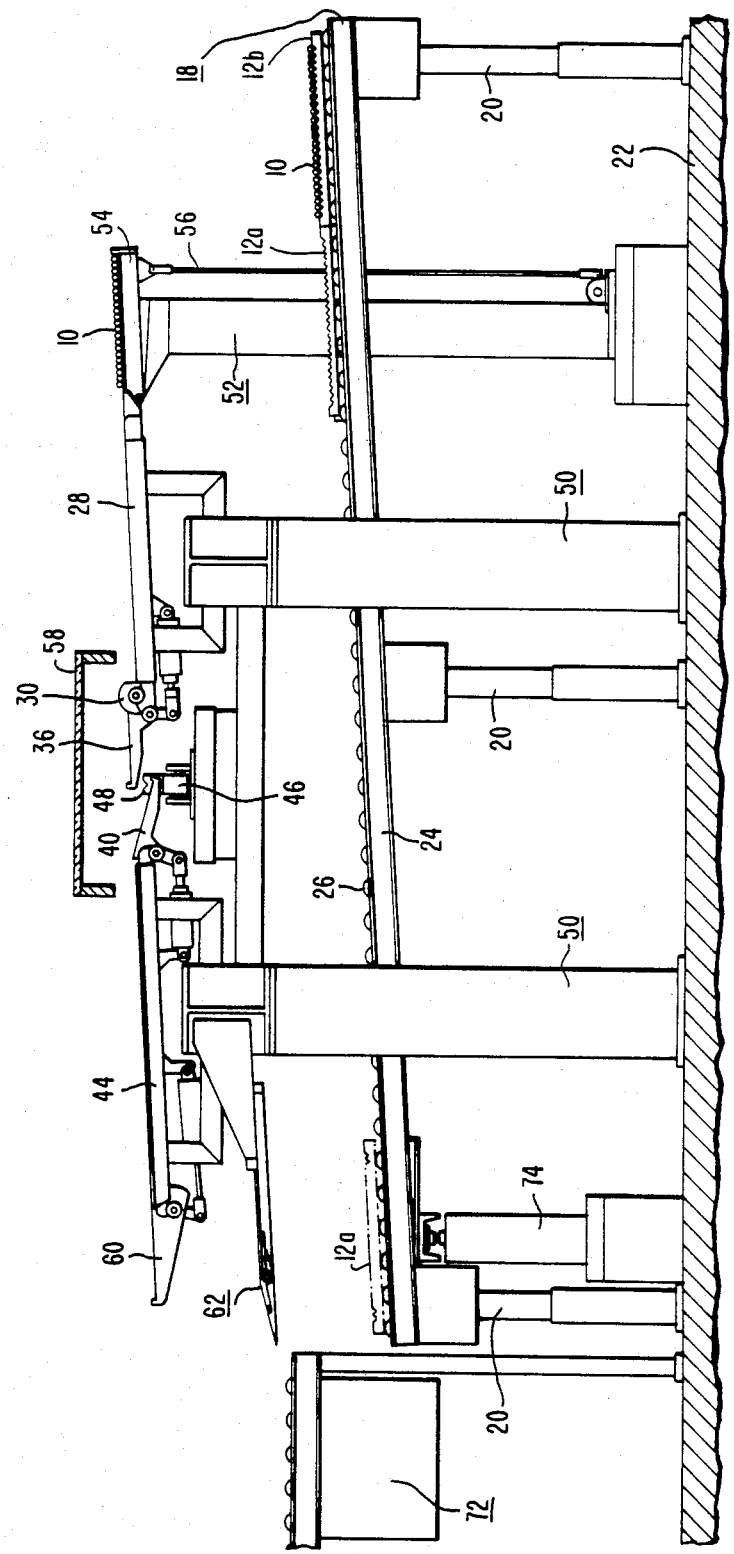
FIG. 1 is a side-elevational schematic view of the nuclear fuel rod weighing system with the rods lifted from a particular tray.
Figure 2:
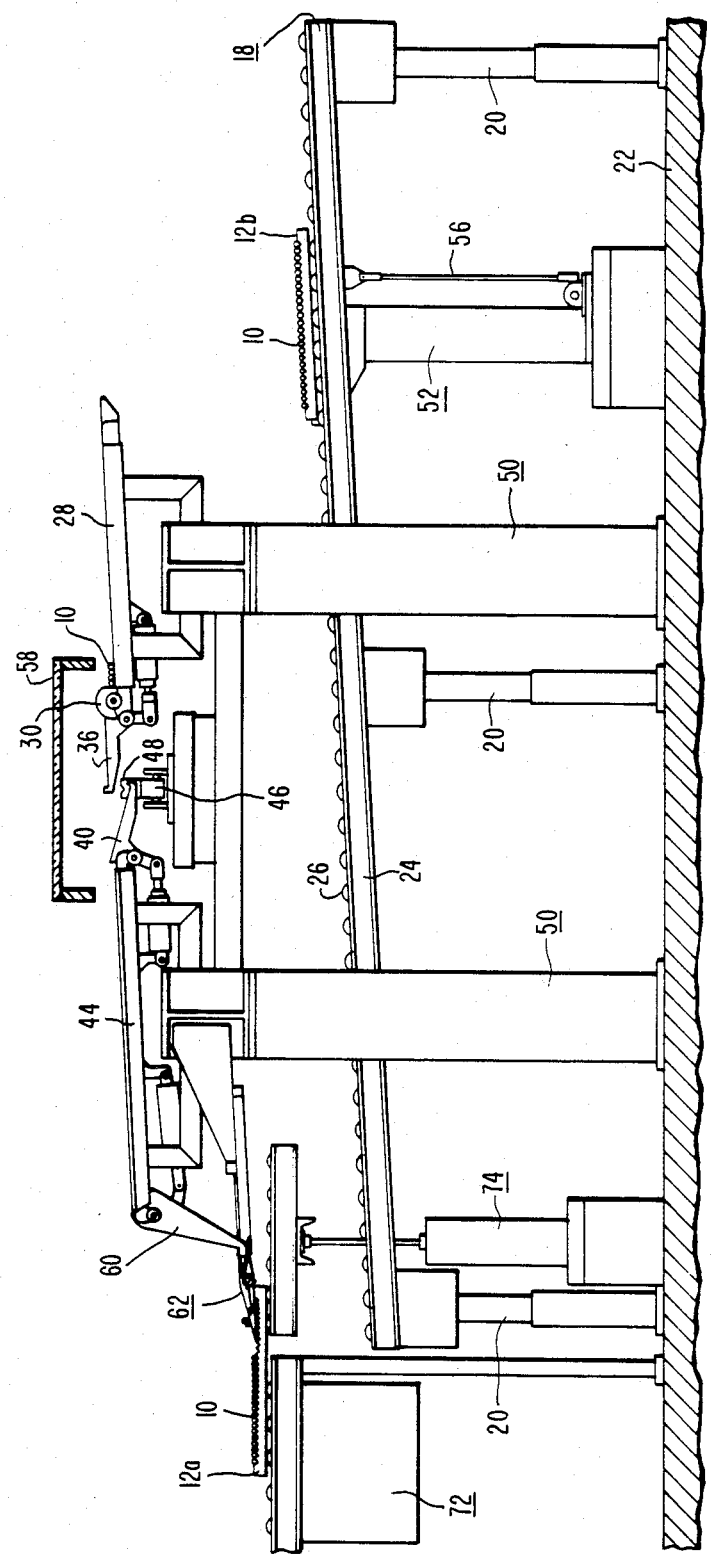
FIG. 2 is the same as FIG. 1 but with the rods in the process of being weighed and returned to the same tray.

Reference will now be made in detail to several present preferred embodiments of the invention, an example of which is illustrated in the accompanying drawings. In the drawings, like reference characters designate like or corresponding parts. A preferred embodiment of the individual nuclear fuel rod weighing system is shown in FIGS. 1 and 2, with details of some of the rod handling equipment shown in the remainder of the figures. The nuclear fuel rods 10 are carried on trays 12. Each tray 12 holds a plurality of rods 10. Preferably the tray 12 has the shape of a generally horizontally positioned ladder with the spaced-apart, parallel ladder (or tray) crosspieces 14 having notches 16 in which the rods 10 are longitudinally carried on the tray 12. The tray 12 moves along a length of a materials handling conveyor 18, between a beginning position (the location of the solid-lined tray 12a to the right in FIG. 1) and an end position (the location of the dashed-lined tray 12a to the left in FIG. 1). Preferably, the conveyor 18 has a multiplicity of spaced-apart, parallel, inclined conveyor ramps 24 with rollers 26, and the tray 12 moves laterally over the rollers 26 under the influence of gravity. In a typical installation, the conveyor 18 is mounted on the plant floor 22 through supports 20 and serves as a conduit for the rods 10 passing from the last fuel rod manufacturing station to the first quality control inspection station.

The individual nuclear fuel rod weighing system includes an overhead loading ramp 28 positioned above the materials handling conveyor 18, a rod lifting means, a weighing scale 46 solidly positioned above the materials handling conveyor 18, a rod loading means, and a rod transferring means.

The rod lifting means are means for lifting the rods 10 from the tray 12, when the tray 12 is at its beginning position on the conveyor 18, and placing them on the overhead ramp 28. Preferably, the rod lifting means includes a plurality of hydraulic lifts 52 positioned to the side of, and below, both the conveyor ramps 24 and the tray crosspieces 14, with the hydraulic lifts 52 simultaneously lifting all the rods from their tray. It is desirable for each hydraulic lift 52 to have a tiltable lift pad 54 activated by a linkage 56. Other rod lifting means includes any conventional mechanical lift powered by an electric motor, a pneumatic cylinder, and the like.

Preferably, the scale 46 has solid supports 50 which extend to the outside of, and below, the conveyor ramps 24. It is desirable that means be provided for shielding the scale 46 from air currents which can affect the accuracy of the scale readings for the weight of a rod 10. Preferably, such shielding means includes a partial cover 58 attached to the scale supports 50 (the attachment being omitted for clarity in FIGS. 1 and 2). Other shielding means includes a ceiling suspended guard, and the like.

Figure 3A:
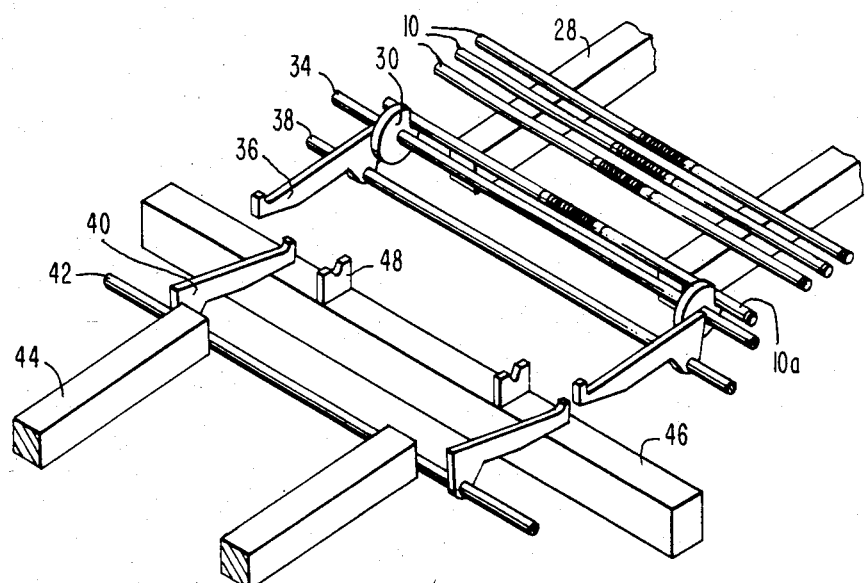
FIGS. 3A, 3B and 3C are perspective schematic enlarged views of a portion of FIG. 1 showing the weighing scale and adjacent rod handling equipment including the various operations for placing a rod onto, and removing the rod from, the scale.
Figure 3B:
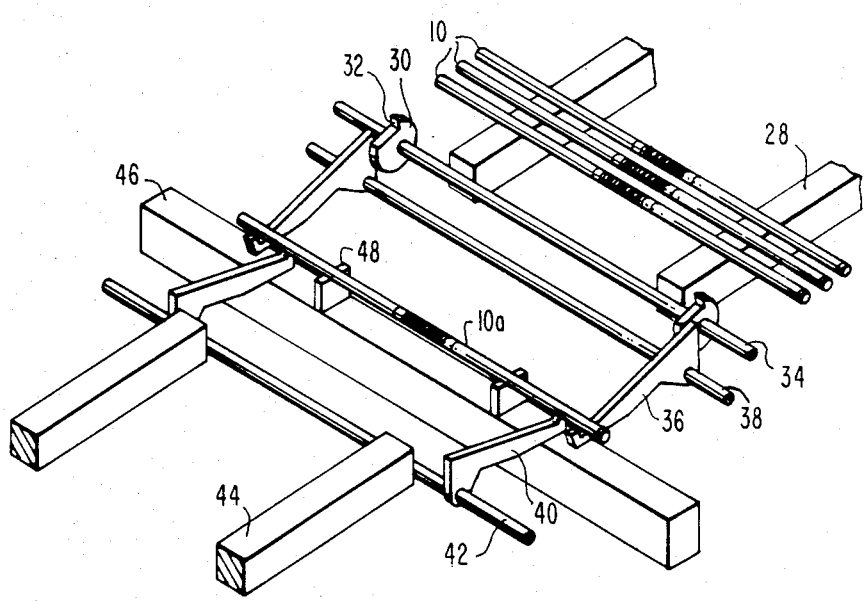

Means are provided for loading the rods 10, one at a time, from the overhead loading ramp 28 onto the scale 46 for individual weighing. The loading means could be any conventional rod handling equipment, including the use of robots, but preferably, such means includes a plurality of rod escapement wheels 30 and rod loading arms 36 (as seen in FIGS. 3A and 3B). The scale 46 is equipped with attached rod holders 48 upon which a rod 10 is placed for weighing. A single leading rod 10a fits in a recess 32 of the loading or escapement wheels 30. A shaft 34 turns the escapement wheels 30 transporting the rod 10a to the loading arms 36. A shaft 38 turns the loading arms 36 lowering the rod 10a to the rod holders 48 on the scale 46.

Additionally, means are also provided for transferring each weighed rod from the scale 46 to the tray 12, when the tray 12 is at its end position on the conveyor 18. Although the preferred embodiment of the invention returns the weighed rods to their original tray, they could equivalently be returned to the tray of some other previously weighed batch of rods if extra empty trays were supplied for receiving such previously weighed rod batches, as can be appreciated by those skilled in the art. The transferring means could also be any conventional rod handling equipment, including the use of robots, but preferably, such means includes a plurality of rod unloading arms 40, rod lowering arms 60, and rod motion arresting means.

Figure 3C:
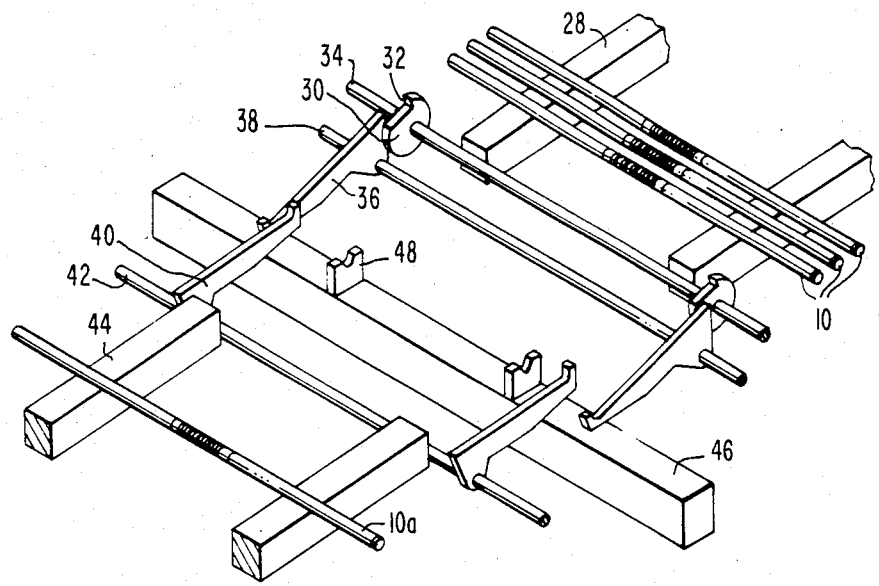
Figure 4B:
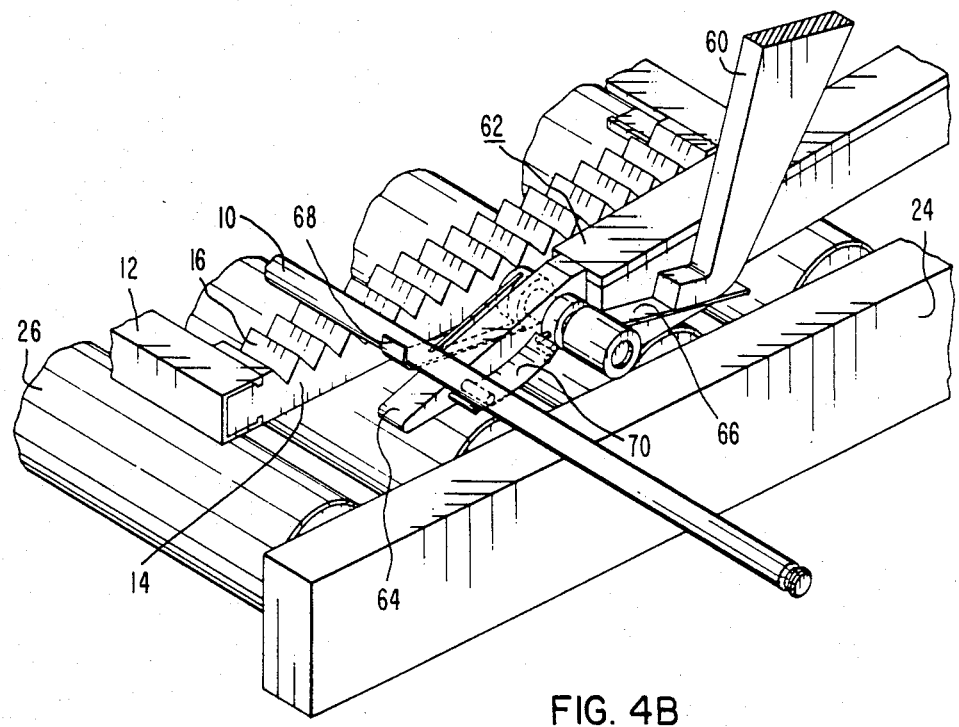
FIGS. 4A and 4B are perspective enlarged views of a portion of FIG. 1 showing an empty tray and adjacent rod handling equipment including the various operations for returning a weighed rod back to its tray.
Figure 4A:
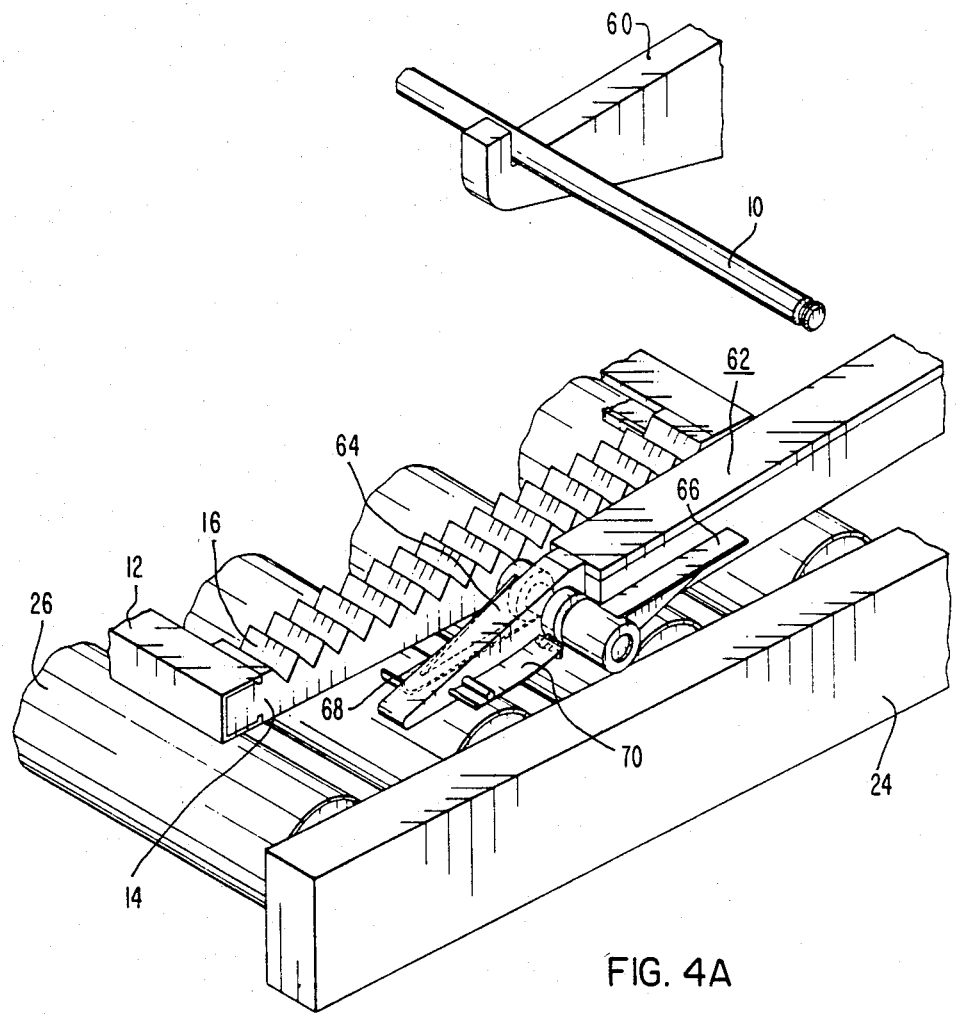

After the rod 10a is weighed, a shaft 42 turns the unloading arms 40 raising the rod 10a from the rod holders 48 to a connecting ramp 44 (as seen in FIGS. 3B and 3C). The rod will roll down the connecting ramp 44 to the rod lowering arms 60. The rod lowering arms 60 have an up position (seen in FIGS. 1 and 4A) to receive the weighed rod from the connecting ramp 44, and a down position (seen in FIGS. 2 and 4B) to deliver that rod to the rod motion arresting means.

The rod motion arresting means are means for arresting the motion of each of the rods 10 before each rod reaches its tray 12, when its tray 12 is at its end position on the conveyor 18. Such means are necessary to insure that the rods will gently enter their trays. Preferably, such a rod motion arrestor 62 includes a guide rail 64, a lever 66, and a raisable rod stop 68 (see FIGS. 4A and 4B). The lever 66 is attached to, and actuates, the raisable rod stop 68. A spring 70 biases the rod stop 68 to a lowered position. Also, preferably, the rod lowering arms 60 are placed (relative to the rod motion arrestor 62) such that when they are in their down position, they contact and actuate the levers 66 to raise the rod stop 68, while when they are in their up position, they will not contact and hence not actuate the levers. Other rod motion arresting means include powerized rod stops activated by a rod rolling past or over a switch and deactivated by a time delay, and the like, as can be assembled by those skilled in the art.

The rod transferring means can optionally include means for raising the tray 12, to reduce the vertical distance a rod 10 would have to be transferred from the scale 46 to the tray 12, when the tray 12 is at its end position on the conveyor 18. Preferably, such means includes a group of hydraulic lifts 74 to evenly raise the tray 12a (see FIGS. 1 and 2). Other tray raising means includes conventional mechanical lifts powered by electric motors, pneumatic cylinders, and the like.

The system of the invention allows use of a tray indexer 72 (see FIG. 2) which moves the tray sideways a distance generally equal to a rod's diameter after each time a weighed rod is loaded back onto its tray. This enables the rods to be returned to their notched positions in the tray, especially when using the rod motion arrestor 62 for gentle delivery of each rod to its tray. Devices for indexing the position of containers for loading of objects therein are known to those skilled in the art.

It is noted that the scale supports 50 also support the rod lowering means and the rod transferring means.

It is desirable to have a computer system to store rod weight data and to serve as a controller to synchronize the operations of the tray and rod handling equipment, as can be appreciated by those skilled in the art.

A cycle of operation of the individual nuclear fuel rod weighing system begins with a tray 12a, of unweighed rods 10, rolling along the conveyer 18 and being stopped by a tray stop (not shown) at a beginning position (see the solid-lined tray 12a in FIG. 1). The rod lifts 52 then raise the rods 10 from the tray 12a after which the linkage 56 tilts the lift pad 54 which rolls all the rods onto the overhead loading ramp 28. The escapement wheels 30 then deliver a single rod 10a at a time to the loading arms 36 which in turn place the rod on the scale's rod holders 48. The scale 46 weighs the rod after which the unloading arms 40 place the rod onto the connecting ramp 44. The rod then rolls to the up-positioned lowering arms 60 (FIGS. 1 and 4A) which then lowers to their down position (FIGS. 2 and 4B) actuating the lever 66 raising the stop 68 of the rod motion arrestor 62. The rod rolls off the lowering arms 60 onto the guide rail 64 and against the stop 68. Before the lowering arms 60 raise up to await the second rod from the scale and to release the rod stop 68, the tray 12 has already rolled down the conveyor 18 to its end position thereon (the dashed-lined tray 12a in FIG. 1), and has been raised by the tray lift 74 and has been properly positioned by the tray indexer 72 (see FIG. 2). When the rod stop is released (and returns to its spring-biased lowered position) by the raising of the lowering arms 60, the first rod 10a gently rolls off the end of the guide rail 64 into proper position in the tray. The tray is indexed before each additional rod completes its weighing operation and is returned to the tray. When a tray 12a has been filled with weighed rods 10, another tray 12b begins the individual rod weighing process.

An advantage of the invention, which will be appreciated by those skilled in the art from the previous description, is the option of having the fuel rods move along the conveyor length without interruption and without leaving their tray when it is desirable to bypass the rod weighing operations.

It will be apparent that many modifications and variations are possible in light of the above teachings. It, therefore, is to be understood that within the scope of the appended claims, the invention may be practiced other than as specifically described.

We claim:

1. A system for individually weighing nuclear fuel rods carried on a tray moving from a beginning position to an end position along a length of a materials handling conveyor, comprising:
   (a) an overhead ramp disposed above said materials handling conveyor;
   (b) means for lifting said rods from said tray, when said tray is at said beginning position, and placing them on said overhead ramp;
   (c) a scale fixedly disposed above said materials handling conveyor;
   (d) means for loading said rods, one at a time, from said overhead ramp onto said scale for individual weighing; and
   (e) means for transferring each weighed said rod from said scale to said tray, when said tray is at said end position.

2. The system of claim 1, also including means for shielding said scale from air currents.

3. The system of claim 1, wherein said loading means includes a plurality of rod escapement wheels and rod loading arms.

4. The system of claim 1, wherein said transferring means also includes means for raising said tray, to reduce the vertical distance a said rod would have to be transferred from said scale to said tray, when said tray is at said end position.

5. The system of claim 1, wherein:
   (a) said materials handling conveyor includes a plurality of spaced-apart, parallel, inclined conveyor ramps having rollers,
   (b) said tray has a generally horizontal ladder configuration including spaced-apart, parallel crosspieces having notches, with said rods carried longitudinally on said tray in said notches and with said tray moving laterally from said first position to said second position over said rollers, and (c) said lifting means includes a plurality of hydraulic lifts disposed to the side of and below said conveyor ramps and said crosspieces.

6. The system of claim 5, wherein said hydraulic lifts each include a tiltable lift pad.

7. The system of claim 2, wherein said scale includes supports extending to the outside of and below said conveyor ramps.

8. The system of claim 1, wherein said transferring means includes a plurality of: rod unloading arms, rod lowering arms having an up position and a down position, and means for arresting the motion of each of said rods before each said rod reaches said tray, when said tray is at said end position.

9. The system of claim 8, wherein each of said rod motion arresting means includes a guide rail, a lever, and a raisable rod stop, with said rod stop attached to said lever, spring biased to a lowered position, and actuated by said attached lever.

10. The system of claim 9, wherein said rod lowering arms are disposed with respect to said rod motion arresting means such that each said rod lowering arm in said down position will contactably actuate a corresponding said lever and in said up position will be spaced-apart from the corresponding said lever.

* * * * *